United States Patent
Sauder et al.

(10) Patent No.: US 9,848,523 B2
(45) Date of Patent: *Dec. 26, 2017

(54) DYANMIC SUPPLEMENTAL DOWNFORCE CONTROL SYSTEM FOR PLANTER ROW UNITS

(71) Applicant: Precision Planting LLC, Tremont, IL (US)

(72) Inventors: Derek A. Sauder, Tremont, IL (US); Jeremy J. Hodel, Morton, IL (US)

(73) Assignee: Precision Planting, LLC, Tremont, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/372,610

(22) Filed: Dec. 8, 2016

(65) Prior Publication Data
US 2017/0086347 A1    Mar. 30, 2017

Related U.S. Application Data

(63) Continuation of application No. 14/585,764, filed on Dec. 30, 2014, now Pat. No. 9,532,496, which is a continuation of application No. 14/155,483, filed on Jan. 15, 2014, now Pat. No. 8,924,102, which is a continuation of application No. 13/014,546, filed on Jan. 26, 2011, now Pat. No. 8,634,992.

(51) Int. Cl.
| | |
|---|---|
| A01B 63/22 | (2006.01) |
| A01B 63/00 | (2006.01) |
| A01C 7/20 | (2006.01) |
| A01C 7/08 | (2006.01) |
| G01L 1/22 | (2006.01) |
| A01B 71/02 | (2006.01) |

(52) U.S. Cl.
CPC ............ *A01B 63/008* (2013.01); *A01B 63/22* (2013.01); *A01B 71/02* (2013.01); *A01C 7/205* (2013.01); *G01L 1/2206* (2013.01); *A01C 7/08* (2013.01)

(58) Field of Classification Search
CPC ......... A01B 63/22; A01B 63/16; A01B 63/14; A01B 63/00; A01B 63/002; A01B 63/008; A01B 71/02; A01B 71/00; A01C 7/08; A01C 7/00; A01C 7/205; A01C 7/201; A01C 7/20; G01L 1/2206; G01L 1/22; G01L 1/20; G01L 1/00
USPC .......... 701/50; 172/1, 2, 4–12; 111/134–137, 111/59, 62, 190–196, 149
See application file for complete search history.

(56) References Cited

U.S. PATENT DOCUMENTS

| | | | | |
|---|---|---|---|---|
| 4,753,298 A | * | 6/1988 | Hansen | A01B 45/023 172/125 |
| 6,359,403 B1 | * | 3/2002 | Pollklas | B60K 31/04 180/65.1 |
| 6,389,999 B1 | * | 5/2002 | Duello | A01C 5/064 111/200 |

(Continued)

*Primary Examiner* — Christopher J. Novosad
(74) *Attorney, Agent, or Firm* — Thomas J. Oppold; Larkin Hoffman Daly & Lindgren, Ltd.

(57) ABSTRACT

A dynamic supplemental downforce control system for a planter row unit. The system includes closed-loop feedback circuit that cooperates with a downforce actuator to dynamically control fluid flow to the downforce actuator to maintain balance between the actual gauge wheel downforce and a desired gauge wheel downforce during planting operations.

19 Claims, 9 Drawing Sheets

(56) References Cited

U.S. PATENT DOCUMENTS

| | | | |
|---|---|---|---|
| 8,634,992 B2* | 1/2014 | Sauder | A01C 7/205 111/135 |
| 8,924,102 B2* | 12/2014 | Sauder | A01C 7/205 111/136 |
| 9,532,496 B2* | 1/2017 | Sauder | A01C 7/205 |
| 2004/0231575 A1* | 11/2004 | Wilkerson | A01C 7/06 111/127 |
| 2012/0048159 A1* | 3/2012 | Adams | A01C 7/203 111/163 |
| 2012/0060730 A1* | 3/2012 | Bassett | A01C 7/205 111/149 |

\* cited by examiner

DYANMIC SUPPLEMENTAL DOWNFORCE CONTROL SYSTEM FOR PLANTER ROW UNITS

BACKGROUND

It is recognized that sufficient downforce must be exerted on a planter row unit to ensure the desired furrow depth and soil compaction is achieved. If excessive downforce is applied, especially in soft or moist soils, the soil may be overly compacted which can affect the ability of germinating seeds to break through the soil. If insufficient downforce is applied, particularly in hard or dry soil, the planter may ride up and out of the soil resulting in insufficient depth of the furrow.

In the past, coiled springs extending between the parallel arms of the row units of the planter (see FIG. 1) were often employed to provide the additional or "supplemental" downforce needed to ensure the desired furrow depth and soil compaction was achieved. By positioning the spring at various preset locations along the parallel arms, the amount of downforce exerted on the row unit could be increased or decreased. However, the amount of supplemental downforce exerted by the spring remained constant until the spring was repositioned. For example, when the planter encountered hard or dry soil such that greater supplemental downforce is necessary to maintain furrow depth or the desired soil compaction, the operator had to stop and adjust the location of the spring in order to increase the supplemental downforce. Furthermore, during operation, as the seed or fertilizer in the hoppers was dispensed, the weight of the row unit gradually decreased causing a corresponding reduction in the total downforce on the gauge wheels, because the supplemental downforce exerted by the spring remained substantially constant until the spring was manually repositioned.

More advanced supplemental downforce systems, such as disclosed in U.S. application Ser. No. 12/679,710 (Pub. No. US2010/0198529) by Sauder et al. (hereinafter "the Sauder '710 Application"), which is incorporated herein in its entirety by reference, measure the strain in a member of the gauge wheel adjusting mechanism to determine the force being exerted against the gauge wheels to determine the downforce. A central processor or controller actuates the hydraulic or pneumatic cylinders, airbags or other actuators to increase or decrease the supplemental downforce across all the row units. While such systems may serve their intended purpose, they can be more costly because they require central processing circuitry as well as hydraulic or pneumatic valves, load sensors, and associated cable harnesses at each row unit in order to properly maintain the desired downforce. Moreover, the required processing steps increase the response time of such a system as compared with the use of coil springs or other earlier mechanical systems for supplying supplemental downforce. In addition, central control systems that apply a common supplemental downforce to each row unit fail to respond to unique loads experienced by each row unit, such that insufficient or excessive supplemental downforce may be applied to any given row unit.

Thus, there is a need for a supplemental downforce control system that maintains a desired downforce at each row unit and additionally allows an operator to set the desired downforce from the tractor cab while on-the-go during planting operations.

DESCRIPTION

Figure 1:
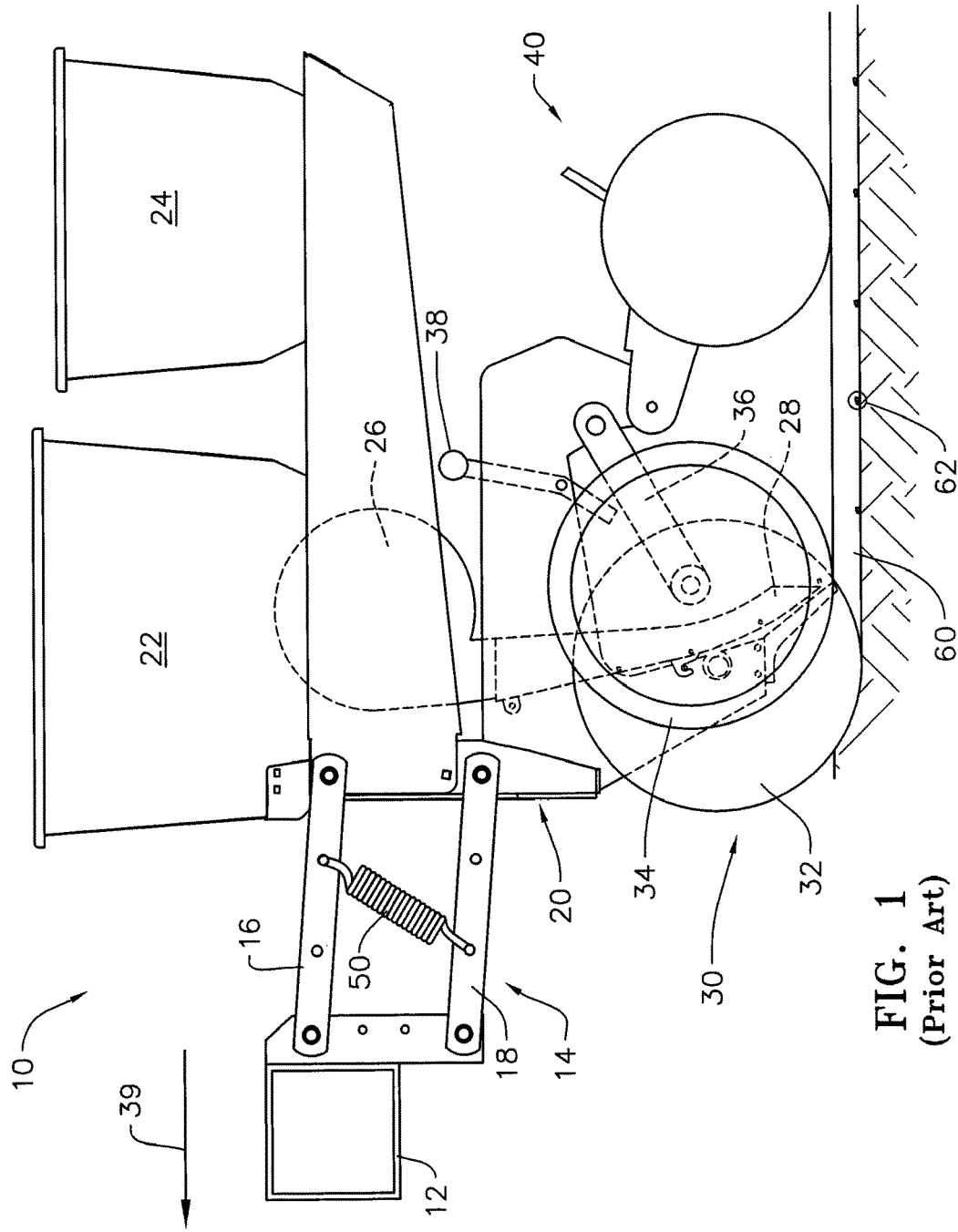
FIG. 1 is a side elevation view of a conventional planter row unit showing the use of a prior art coil spring to provide supplemental downforce.

Referring now to the drawings, wherein like reference numerals designate identical or corresponding parts throughout the several views, FIG. 1 illustrates a side elevation view of a single row unit 10 of a conventional row crop planter such as the type disclosed in U.S. Pat. No. 4,009,668, incorporated herein in its entirety by reference. As is well known in the art, the row units 10 are mounted in spaced relation along the length of a transverse toolbar 12 by a parallel linkage 14, comprised of upper and lower parallel arms 16, 18 pivotally mounted at a forward end to the transverse toolbar 12 and at their rearward end to the row unit frame 20. The parallel linkage 14 permits each row unit 10 to move vertically independently of the toolbar 12 and independently of the other spaced row units in order to accommodate changes in terrain or upon the row unit encountering a rock or other obstruction as the planter is drawn through the field.

The row unit frame 20 operably supports a seed hopper 22, and a smaller hopper 24 for insecticide and/or fertilizer, a seed meter 26 and a seed tube 28 as well as a furrow opener assembly 30 and furrow closing assembly 40. The furrow opening assembly 30 comprises a pair of furrow opener discs 32 and a pair of gauge wheels 34. The gauge wheels 34 are pivotally secured to the row unit frame 20 by gauge wheel arms 36. A furrow depth adjusting member 38 adjustably positions the gauge wheels 34 relative to the furrow opener discs 32 for establishing the desired furrow depth. A coil spring 50 is disposed between the parallel arms 16, 18 to provide supplemental downforce to ensure that the furrow opener discs 32 fully penetrate the soil to the desired depth as set by the depth adjusting member 38 and to provide soil compaction for proper furrow formation. Rather than a coil spring, supplemental downforce may be provided by actuators or other suitable means such as disclosed in U.S. Pat. No. 6,389,999 to Duello, U.S. Pat. No. 6,701,857 to Jensen, in European Patent No. EP0372901 to Baker, and/or the Sauder '710 Application.

In operation, as the row unit 10 is lowered to the planting position, the opener discs 32 penetrate into the soil. At the same time, the soil forces the gauge wheels 34 to pivot upwardly until the gauge wheel arms 36 abut or come into contact with the stop position previously set with furrow depth adjusting member 38 or until a static load balance is achieved between the vertical load of the row unit and the reaction of the soil. As the planter is drawn forwardly in the direction indicated by arrow 39, the furrow opener discs cut a V-shaped furrow 60 into the soil while the gauge wheels 34 compact the soil to aid in formation of the V-shaped furrow. Individual seeds 62 from the seed hopper 22 are dispensed by the seed meter 26 into the seed tube 28 in uniformly spaced increments. The seed tube 28 directs the individual dispensed seeds 62 downwardly and rearwardly between the furrow opener discs 32 and into the bottom of the V-shaped furrow 60. The furrow 60 is then covered with soil and lightly compacted by the furrow closing assembly 40.

Figure 2:
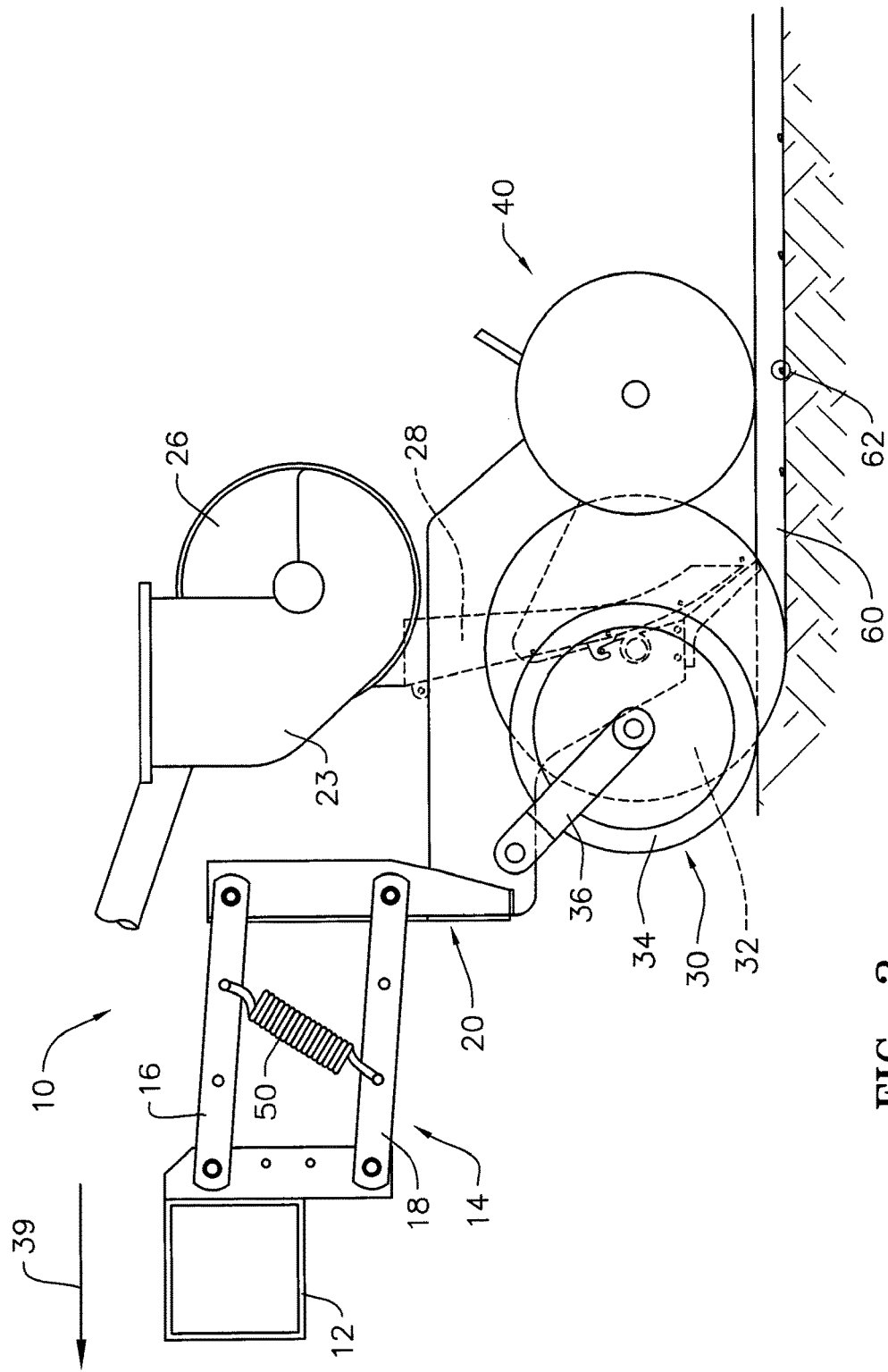
FIG. 2 is a schematic view of another conventional planter row unit showing the use of a prior art coil spring to provide supplemental downforce.

FIG. 2 illustrates a side view of another embodiment of a conventional row unit 10 for a central-fill planter such as disclosed in U.S. Pat. No. 7,438,006, incorporated herein in its entirety by reference. As in the row unit embodiment of FIG. 1, the row unit embodiment of FIG. 2 includes a parallel arm linkage 14 comprised of upper and lower parallel arms 16, 18 pivotally mounted at a forward end to the transverse toolbar 12 and at their rearward end to the row unit frame 20. The row unit frame 20 supports a mini seed hopper 23, seed meter 26, a seed tube 28, as well as the furrow opener assembly 30, comprising a furrow opener discs 32 and gauge wheels 34. The gauge wheels 34 are pivotally secured to the row unit frame 20 by gauge wheel arms 36. Unlike the embodiment of FIG. 1, the gauge wheel arms 36 in the embodiment of FIG. 2 extend forwardly of the gauge wheels 34.

Figure 3:
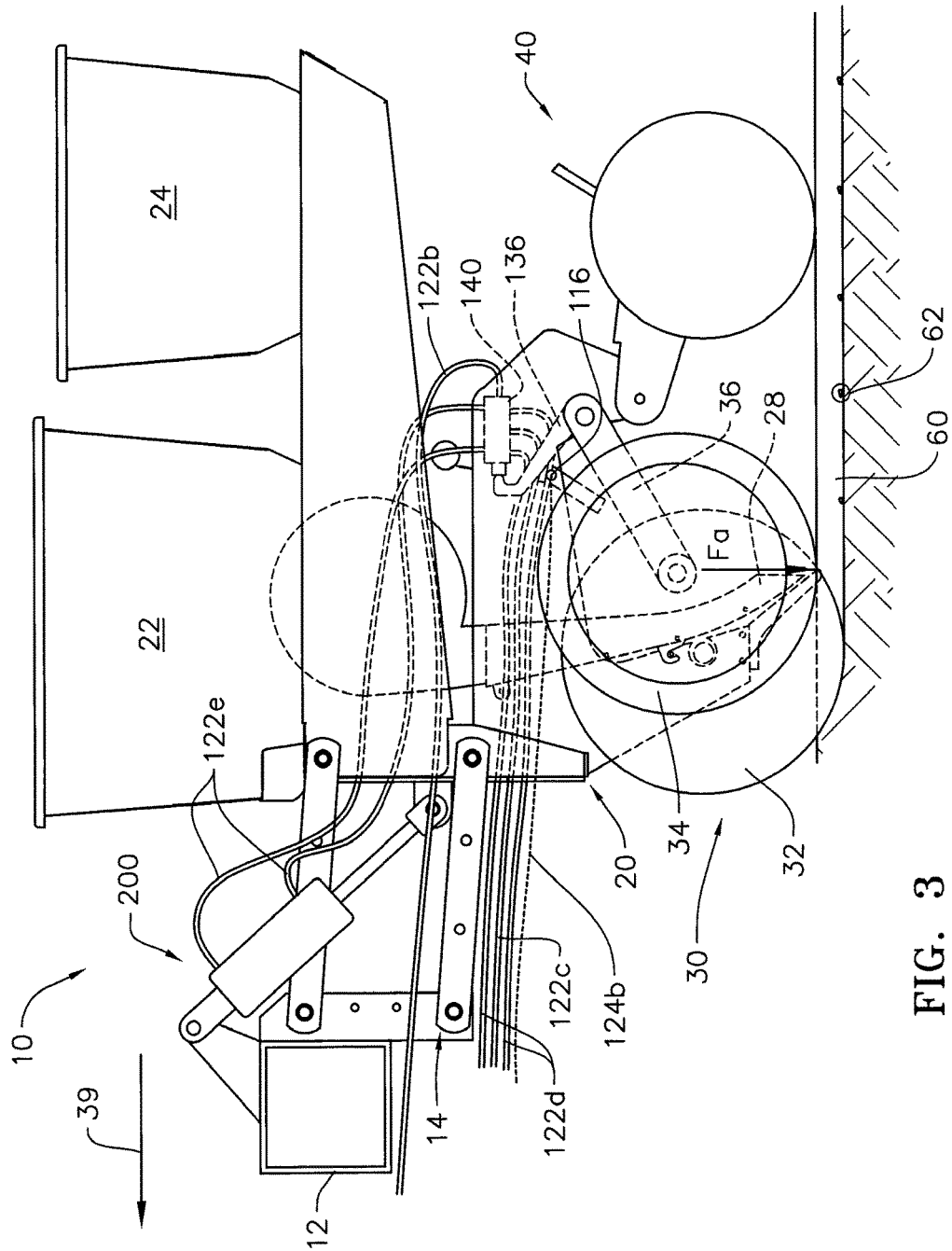
FIG. 3 is a side elevation view of the conventional planter row unit of FIG. 1 with an embodiment of a dynamic supplemental downforce control system.
Figure 4:
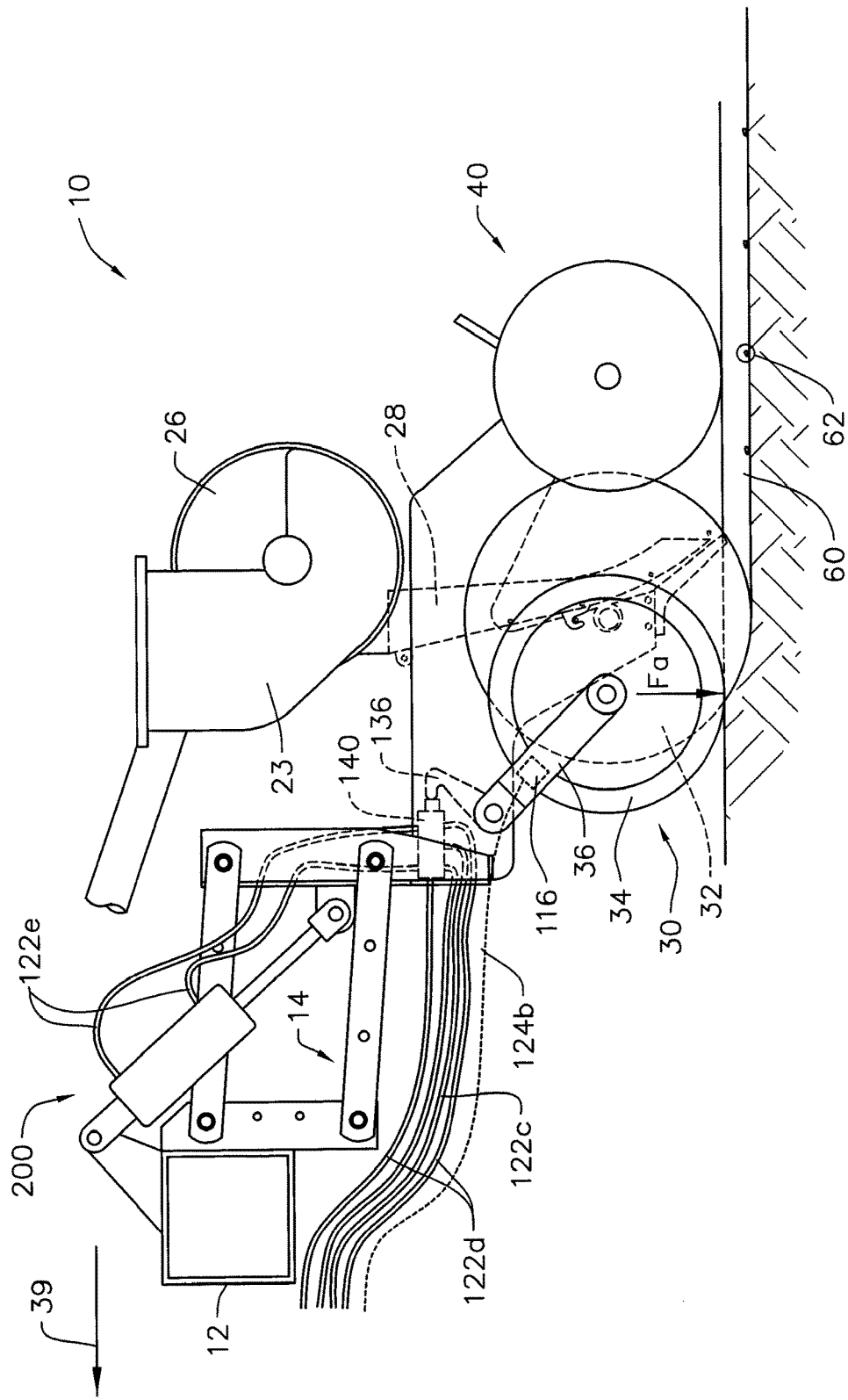
FIG. 4 is a side elevation view of the conventional planter row unit of FIG. 2 with another embodiment of a dynamic supplemental downforce control system.

The row units 10 in FIGS. 3 and 4 are substantially the same as the row units 10 depicted in FIGS. 1 and 2, respectively, except that in FIGS. 3 and 4, the coil springs 50 have been removed and replaced with an embodiment of a dynamic supplemental downforce control system 100 in accordance with the present invention.

Figure 5:
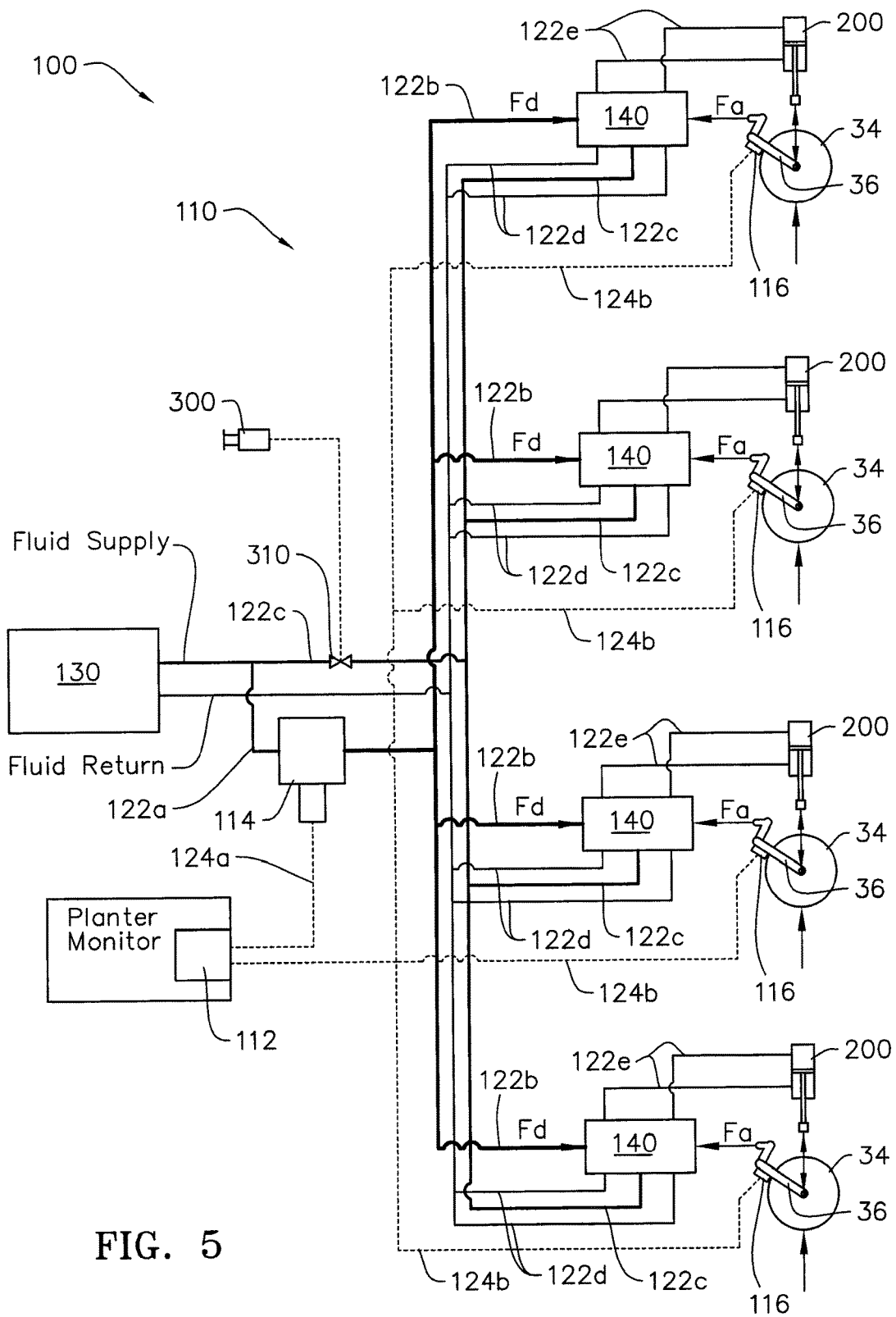
FIG. 5 is a schematic illustration of an embodiment of closed-loop feedback circuit for the dynamic supplemental downforce control system of FIGS. 3 and 4.

FIG. 5 schematically illustrates a preferred embodiment of the automated supplemental downforce control system 100 which comprises a closed-loop feedback circuit 110 that cooperates with a downforce actuator 200. Preferably, the dynamic system 100 utilizes the hydraulic system of the tractor pulling the planter and therefore preferably comprises an electro-hydraulic closed-loop feedback circuit 110 and a dual action hydraulic cylinder 200. However, the dynamic system 100 may be equally adapted for use with pneumatic actuators in cooperation with any corresponding electro-pneumatic closed-loop feedback circuit. It should also be appreciated that although the schematic illustration of FIG. 5 shows the dynamic system 100 in relation to a four-row planters, the dynamic system 100 can be adapted to a planter with any number of row units.

As used herein, the term "actual gauge wheel downforce" Fa (FIGS. 3 and 4) refers to the dead load, live load and supplemental downforce transferred to the soil through the gauge wheels 34 of the row unit 10. The row unit dead load is understood to be the mass of the entire row unit and any accessories mounted thereon. Therefore, the row unit dead load remains substantially constant and would include the mass of the row unit frame 20, the furrow opening assembly 30, the furrow closing assembly 40, the hoppers 22, 24, seed meter 26, seed tube 28 and the mass of any other attachments or devices operably supported or carried by the row unit frame. The row unit live load is understood to be the mass of the seed, insecticide and/or fertilizer within the hoppers 22, 24, 23 of the row unit or otherwise carried by the row unit. The live load typically varies as the material is dispensed during planting operations.

The term "supplemental downforce," as used herein refers to the loading, other than the live load and dead load, that is applied to the row unit to force the row unit downwardly or upwardly relative to the toolbar 12 to achieve the desired furrow depth and soil compaction under the gauge wheels 34. It should be understood that the supplemental downforce may increase or decrease the actual gauge wheel downforce Fa. It is recognized that a certain amount of the row unit dead load, live load and supplemental downforce is carried by the furrow opener discs 32 and the furrow closing assembly 40. Nevertheless, because the preferred system and method 100 disclosed herein preferably involves only the forces or loads exerted on or transferred by the gauge wheels, then loads transferred by the opener discs and closing wheel need not be considered.

Referring to FIGS. 3 and 4, it should be appreciated that if the downforce actuator 200 is extended, the row unit 10 will be forced downwardly relative to toolbar 12, resulting in an increase in the supplemental downforce and a corresponding increase in the actual gauge wheel downforce Fa. Likewise, if the downforce actuator 200 is retracted, the row unit 10 will be pulled upwardly relative to the toolbar 18, resulting in a decrease in the supplemental downforce and a corresponding reduction in the actual gauge wheel downforce Fa.

Referring to FIG. 5, the preferred electro-hydraulic closed-loop feedback circuit 110 comprises a control module 112, a pilot pressure control valve 114, one load sensor 116 (preferably one per row unit), at least one direction control valve 140 (preferably one per row unit), fluid lines 122 and signal lines 124. As described in greater detail later, a lever 136 (FIGS. 3 and 4) is preferably disposed to transmit the up and down directional displacement of the gauge wheels and thus the corresponding actual gauge wheel downforce Fa, to the direction control valve 140. The signal lines 124 communicate electrical signals between the control module 112, the load sensor 116, the pilot pressure valve 114, and the direction control valve 140. The fluid lines communicate hydraulic fluid between a fluid source 130, the pilot pressure control valve 114, the direction control valve 140 and the downforce actuator 200. The fluid source 130 is preferably the hydraulic fluid reservoir of the tractor pulling the planter. It should be appreciated that if the dynamic system 100 is an electro-pneumatic system, the fluid source may be an air compressor, compressed air tank or other suitable air source.

In general, through the control module 112, the operator is able to set the desired gauge wheel downforce Fd, which, in one embodiment, corresponds to the output pressure of the pilot pressure control valve 114. The control module 112 also preferably permits the operator to view the actual gauge wheel downforce Fa of the row units 10 as detected by the load sensors 116. The direction control valve 140 permits fluid flow to and from the individual downforce actuators 200 in response to any imbalance between the desired gauge wheel downforce Fd acting at one end of the direction control valves 140 against the actual gauge wheel downforce Fa acting at the other end of the direction control valves 140. Thus, the dynamic system 100 independently and dynamically adjusts the supplemental downforce for each individual row unit as each row unit experiences unique loading conditions during planting operations. The downforce adjustment occurs without the need for complex and expensive central processing circuitry or software programming that would otherwise be required to simultaneously monitor and compare the desired gauge wheel downforce Fd with the actual gauge wheel downforce Fa across all row units and to then send signals to independently control the downforce actuators 200 at each row unit.

Although it is preferable for each row unit 10 to have separate load sensor 116 so the operator can monitor the actual gauge wheel downforce for each row, it may be desirable to have load sensors on only certain row units, such as on the outside row units and one or two inner row units. It should also be appreciated that although it is desirable for each row unit 10 to have a direction control valve 140, a single direction control valve 140 may be used to control fluid flow to the downforce actuators 200 of multiple row units. Similarly a single downforce actuator 200 may be utilized to control the supplemental downforce across multiple row units.

The pilot pressure control valve 114 is in fluid communication with the fluid source 130 via fluid lines 122a and the direction control valve 140 via fluid lines 122b. It is also in electrical communication with the control module 112 via signal lines 124a. The operator is able to set the desired output pressure of the pilot pressure control valve 114 via the control module 112. Suitable pilot pressure control valves include solenoid-operated proportional valves such as model no. PV72-21 distributed by HydraForce, Inc. in Lincolnshire, Ill.

The load sensor 116 is disposed to preferably generate an electrical signal corresponding to the actual gauge wheel downforce Fa (FIGS. 3-5). The control module 112 receives the generated signal from the load sensor 116 via the signal lines 124b and preferably displays to the operator the actual gauge wheel downforce Fa corresponding to the generated signal. In a preferred embodiment, the load sensor 116 is a strain gauge such as a Wheatstone bridge circuit mounted in any suitable location from which the actual gauge wheel downforce Fa can be reasonably accurately determined. For example, the load sensor 116 may be mounted to detect the strain in the gauge wheel arm 36 (FIGS. 4 and 5) such as disclosed in U.S. Pat. No. 6,389,999 to Duello, or U.S. Pat. No. 6,701,857 to Jensen, or the strain in the pivot pin of the depth adjusting member 38 (FIG. 3), such as disclosed in the Sauder '253 Application, or in the equalizer for the depth adjusting member as disclosed in U.S. Provisional Application No. 60/883,957 filed Jan. 8, 2008 by Sauder et al., or in a location such as disclosed in European Patent No. EP0372901 to Baker. All of the above-referenced patents and/or patent applications are incorporated herein in their entireties by reference.

The control module 112 is preferably integrated into an existing planter monitor that provides a user interface, such as a touch screen, keypad or other input means, through which the operator can select or input the desired gauge wheel downforce Fd. The control module 112 is also preferably integrated into an existing planter monitor that provides a display screen or other visual display through which the operator can view and monitor the actual gauge wheel downforce Fa of the row units. In a preferred embodiment, the control module 112 is integrated into the 20/20® planter monitor system sold by Precision Planting, Inc., of Tremont, Ill. and as disclosed in U.S. patent application Ser. No. 12/522,252 (Pub. No. US2010/0010667) by Sauder et al., incorporated herein in its entirety by reference. Those skilled in the art would readily understand how to modify the 20/20® planter monitor or any other planter monitor to integrate the additional programming and circuitry necessary to allow an operator to input a desired gauge wheel downforce Fd for controlling the output of the pilot pressure valve 114 and to also receive and display the actual gauge wheel downforce Fa as detected by the load sensor 116. Alternatively, as would be recognized by those skilled in the art, the control module 112 may be a standalone system incorporating the necessary circuitry for controlling the output pressure of the pilot control valve 114 corresponding to the desired gauge wheel downforce Fd, and/or for displaying the actual gauge wheel downforce Fa of the row units. Regardless of whether the control module 112 is integrated into an existing planter monitor system or as a standalone unit, it is preferably mounted in the cab of the tractor in a location where an operator can view and interact with the user interface during planting operations.

Figure 6:
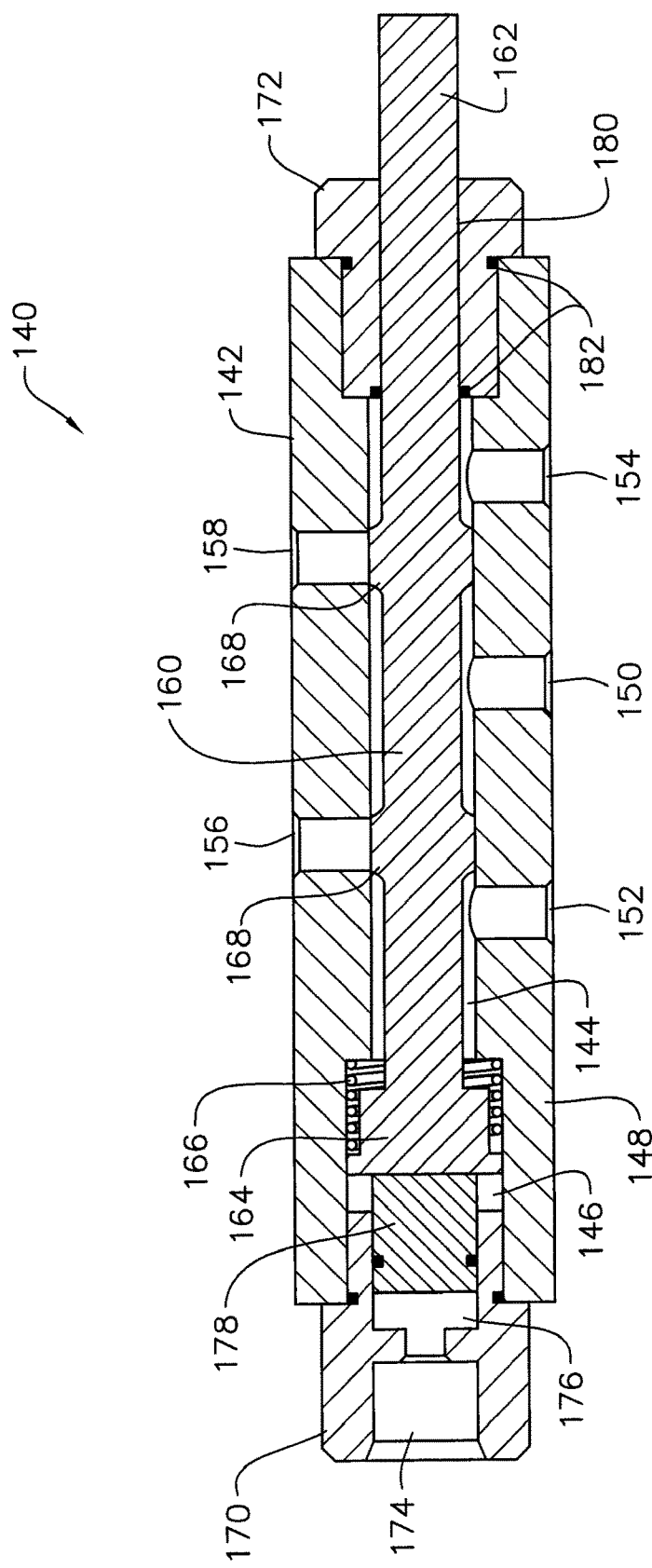
FIG. 6 is a schematic view of an embodiment of the direction control valve for the supplemental downforce control systems of FIGS. 3 and 4.
Figure 7A:
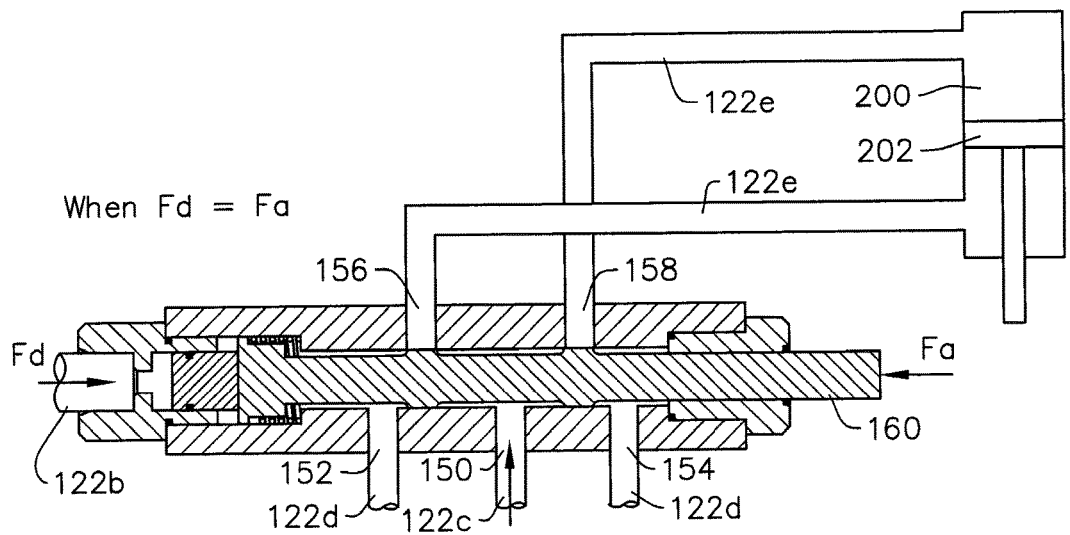
FIGS. 7A-7C illustrate fluid flow and operation of the direction control valve and downforce actuator of FIGS. 3 and 4 utilizing fluid pressure from a pilot pressure control valve to impart the desired gauge wheel downforce Fd.
Figure 7B:
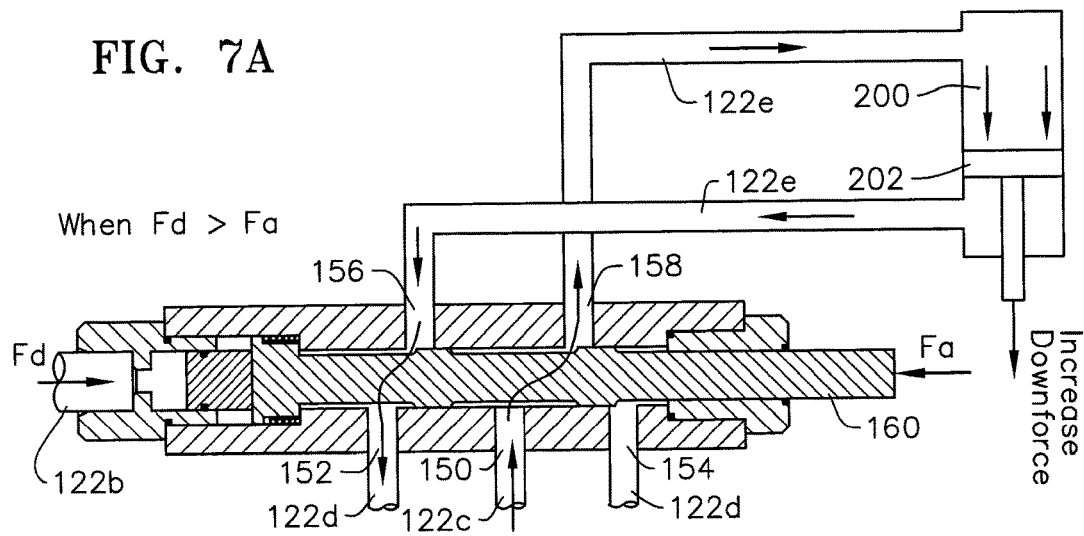
Figure 7C:
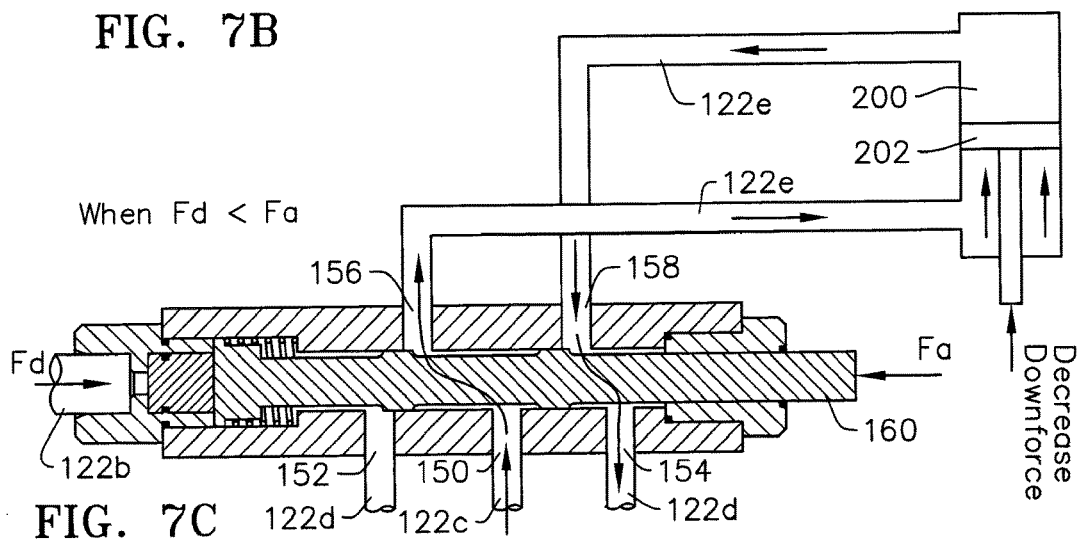

Referring to FIGS. 6 and 7A-7C, the direction control valve 140 is preferably a three-position directional control valve similar such as model no. PTS16-12 distributed by Eaton Corporation, Eden Prairie, Minn. The direction control valve 140 preferably includes a housing 142 having an axial through-bore 144 and an enlarged counterbore 146. A series of ports extend transversely through the sidewall 148 of the housing 142 and into the axial through-bore 144, preferably including an inlet port 150, first and second fluid return ports 152, 154, and first and second actuator ports 156, 158. A spool 160 is slidably disposed within the housing 142. The spool 160 has a shaft 162 and an enlarged head 164. The enlarged head 164 is disposed within the counterbore 146. A spring 166 biases the spool head 164 leftward as viewed in FIG. 6. The shaft 162 includes two longitudinally spaced circumferential rings 168. The circumferential rings 168 define raised surfaces, which, when aligned with the first and second actuator ports 156, 158 as shown in FIG. 6 effectively block the flow of fluid into or out of the ports and prevent passage of fluid from one side of the circumferential ring to the other. Thus, as illustrated in FIGS. 7A-7C, the movement of the spool 160 within the through-bore 144 functions as a three position valve. The direction control valve 140 further includes a head cap 170 and an end cap 172. The head cap 170 includes an axial end port 174 in fluid communication with an axial counterbore 176. A block 178 is slidably disposed within the axial counterbore 176 and abuts the spring biased spool head 164. The end cap 172 has an axial bore 180 through which the distal end of the spool shaft 162 extends. O-rings 182 are provided to fluidly seal the head cap 170 and end cap 172 with the housing 142.

In operation, referring to FIGS. 5, 6 and 7A-7C, fluid lines 122b communicate fluid from the pilot pressure valve 114 to the axial end port 174 of the direction control valves 140 at a pressure corresponding to the desired gauge wheel downforce Fd. Another set of fluid lines 122c communicate pressurized fluid from the fluid pressure source 130 to the inlet port 150 of each direction control valve 140. Another set of fluid lines 122d communicate fluid between the fluid return ports 152, 154 back to the fluid source 130. Another set of fluid lines 122e communicate fluid between the first and second actuator ports 156, 158 to each side of the piston 202 within the downforce actuator 200 of each row unit 10.

The lever 136 (FIGS. 3 and 4) transmits the opposing actual gauge wheel downforce Fa to the distal end of the spool shaft 162 of the direction control valve 140.

As depicted in FIG. 7A, if the desired gauge wheel downforce Fd is the same as the actual gauge wheel downforce Fa transmitted by the lever 136 (i.e., Fd=Fa), the circumferential rings 168 on the spool shaft 162 are preferably aligned with the first and second actuator ports 156, 158 thereby preventing fluid flow to and from the downforce actuator 200.

As depicted in FIG. 7B, if the desired gauge wheel downforce Fd is greater than the actual gauge wheel downforce Fa transmitted by the lever 136 (i.e., Fd>Fa), the spool shaft 162 will be forced to the right opening fluid communication between the fluid inlet port 150 and the second actuator port 158 and opening fluid communication between the first actuator port 156 and the first fluid return port 152 thereby allowing fluid to flow into the piston end of the downforce actuator 200 and out through the rod end of the downforce actuator 200 forcing the piston 202 downwardly thereby increasing the actual gauge wheel downforce Fa. When the actual gauge wheel downforce Fa is sufficiently increased to rebalance with the desired gauge wheel downforce Fd, the spool shaft 162 will return to the position as show in FIG. 7A.

As depicted in FIG. 7C, if the desired gauge wheel downforce Fd is less than the actual gauge wheel downforce Fa transmitted by the lever 136 (i.e., Fd<Fa), the spool shaft 162 will be forced to the left opening fluid communication between the fluid inlet port 150 and the first actuator port 156 and opening fluid communication between the second actuator port 158 and the second fluid return port 154 thereby allowing fluid to flow into the rod end of the downforce actuator 200 and out through the piston end of the downforce actuator 200 forcing the piston 202 upwardly thereby decreasing the actual gauge wheel downforce Fa. When the actual gauge wheel downforce Fa is sufficiently decreased to rebalance with the desired gauge wheel downforce Fd, the spool shaft 162 will return to the position as shown in FIG. 7A.

Figure 8A:
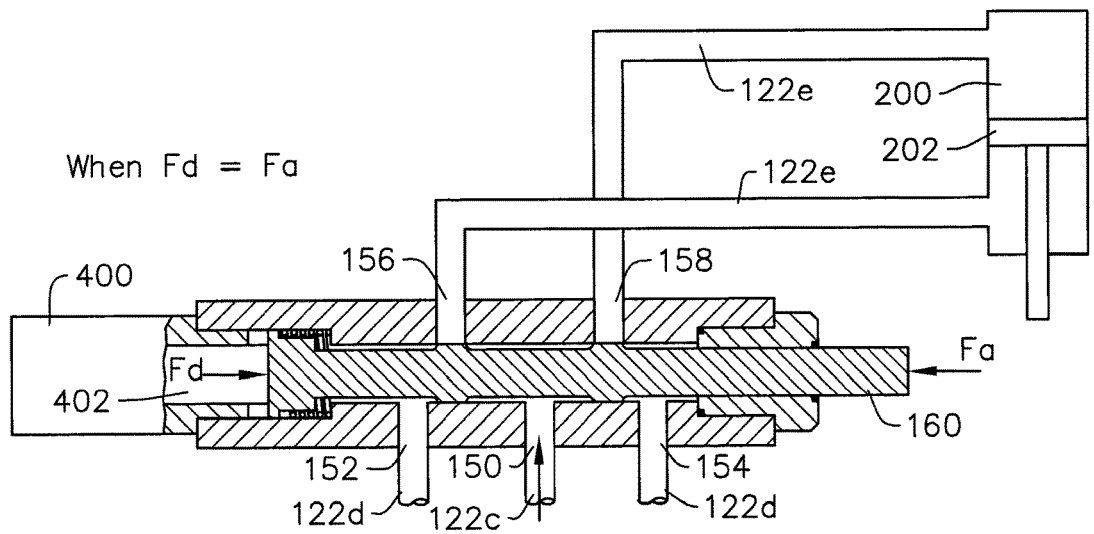
FIGS. 8A-8C illustrate fluid flow and operation of the direction control valve and downforce actuator of FIGS. 3 and 4 utilizing a solenoid to impart the desired gauge wheel downforce Fd.
Figure 8B:
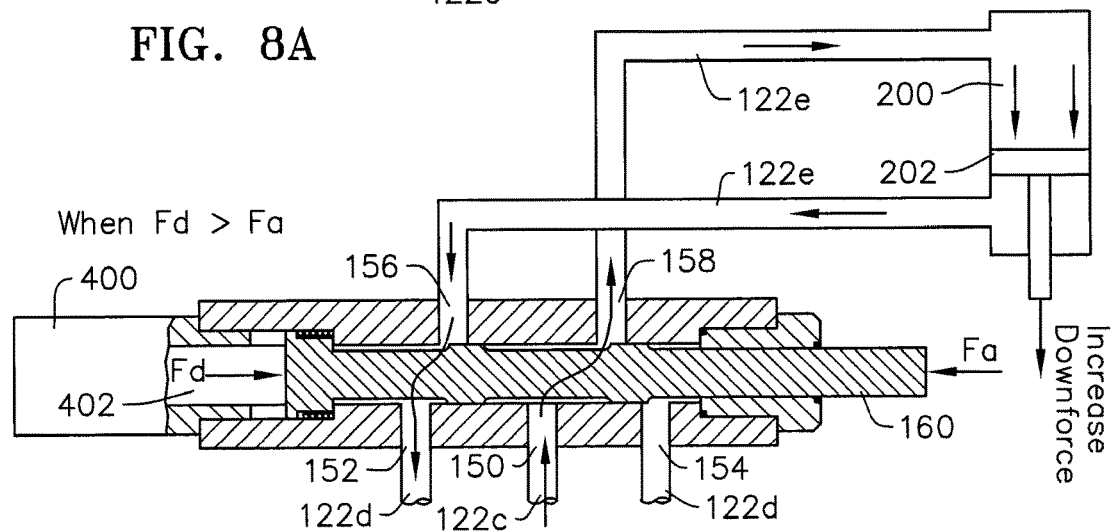
Figure 8C:
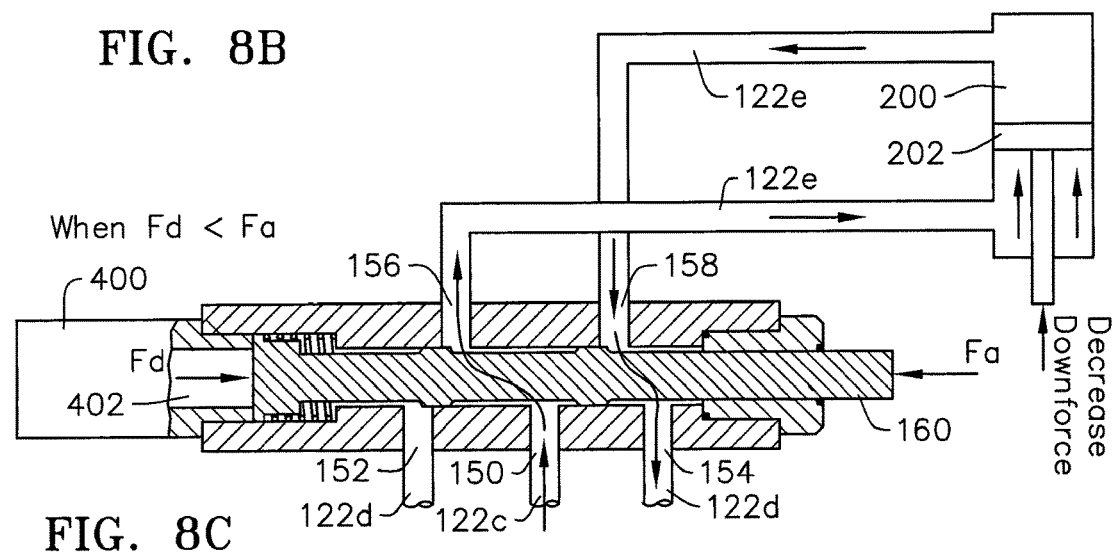

It should be understood that instead of a system that utilizes a pilot pressure control valve 114 to transmit the desired gauge wheel downforce Fd to the direction control valve 140, any suitable electrical or electro-mechanical device may be used to transmit the desired gauge wheel downforce Fd to the direction control valve 140. For example, as illustrated in FIGS. 8A-8C, a solenoid 400 may be employed to transmit the desired gauge wheel downforce Fd against spool head 164. In such an embodiment, the control module 112 would send an electrical signal to the solenoid 400 to cause the solenoid plunger 402 to be displaced corresponding to the desired gauge wheel downforce Fd which in turn acts upon the spool head 164 causing the corresponding displacement of the spool 160 to open and close the ports as described and illustrated in connection with FIGS. 7A-7B.

It should also be understood that the term "direction control valve" 140 should not be construed as being limited to the embodiment described and illustrated herein, but should instead be understood to include any device or combination of devices that allows fluid flow to and/or from the downforce actuator 200 when the actual gauge wheel downforce Fa becomes imbalanced with the desired gauge wheel downforce Fd.

Because the gauge wheels 34 may occasionally encounter rocks or other obstructions during planting operations that may cause high impact forces, the direction control valve 140 is preferably mounted in a manner to avoid damage from the impact forces. For example, the direction control valve 140 is preferably bias mounted to allow the control valve 140 to displace longitudinally if an abrupt force imposed by the lever 136 on the spool 160 causes the spool head 164 to bottom out against the head cap 170. When the abrupt force is removed, the bias mount returns the direction control valve 140 to its normal position.

In a preferred embodiment, the control module 112 cooperates with a Global Positioning System (GPS) and is configured to access a desired downforce prescription map for setting and/or modifying the desired gauge wheel downforce Fd as the planter traverses the field. The downforce prescription map may be based upon soil types, elevations, or location-specific preferences set by the operator prior to operation. In such an embodiment, the control module 112 may be used to specify a different desired gauge wheel downforce Fd to each row unit or groups of row units to more accurately follow the downforce prescription map. For example, if the locations of the far right row unit and the far left row unit on the planter correspond to different prescribed desired gauge wheel downforces Fd based on soil type or other predefined factor, the control module 12 is preferably capable of setting the appropriate desired gauge wheel downforce Fd for each of the row units.

In addition, the control module 112 is preferably configured to determine and display a ground contact percentage as disclosed in applicant's co-pending international patent application no. PCT/US2008/050427 (Pub. No. WO2009/042238), which is incorporated herein in its entirety by reference. The control module 112 is preferably configured to allow the operator to select a desired minimum ground contact percentage in addition to, or rather than, inputting a specific desired gauge wheel downforce Fd. In such an embodiment, the desired gauge wheel downforce Fd would be the desired minimum ground contact percentage. The dynamic system 100 would adjust the supplemental downforce until the actual gauge wheel downforce Fa in relation to the desired gauge wheel downforce Fd resulted in the desired minimum ground contact percentage over the sampling period. Thus, as used herein, the term "desired gauge wheel downforce Fd" should be understood to include a force that may be expressed as a numerical value or as a percentage of ground contact.

The closed-loop feedback circuit 110 preferably cooperates with a transport position detector 300 (FIG. 5), such as a height sensor or contact switch disposed on the frame of the planter, to detect when the planter is raised into a transport position. It should be appreciated that when the planter is raised, the gauge wheel arms 36 will pivot downwardly resulting in the load sensor 116 to sense zero or near zero actual gauge wheel downforce Fa, which in turn will result in fluid flow to the downforce actuator 200 until it is fully extended. To prevent such a result from occurring, the transport position detector 300 is preferably in electrical communication with a valve 310 disposed along the fluid supply line 122c. When the detector 300 detects that the planter is in a transport position, the valve 310 is closed to prevent the flow of fluid from the fluid source 130 to the fluid inlet ports 150 of the direction control valves 140 of the row units 10. The valve 310 is preferably a two-position normally open solenoid valve.

Alternatively, instead of a separate valve 310 disposed in the fluid supply line 122c, the transport position detector 300 may be in electrical communication with the pilot pressure control valve 114 such that when the planter is raised into the transport position, the transport position detector 300 sends a signal to cause the pilot pressure control valve 114 to close. In such an event the downforce actuators 200 will automatically "raise" in an effort to rebalance the load between Fd and Fa, by allowing fluid to flow through the direction control valve 140 as indicated in FIG. 7C or 8C, because Fd will be zero when the pilot pressure control valve 114 is closed. When the load sensor 116 senses zero when the gauge wheels are raised above the soil such that Fd=Fa, the direction control valve 140 will return to the position illustrated in FIG. 7A or 8A preventing fluid flow to the downforce actuator 200.

Figure 9:
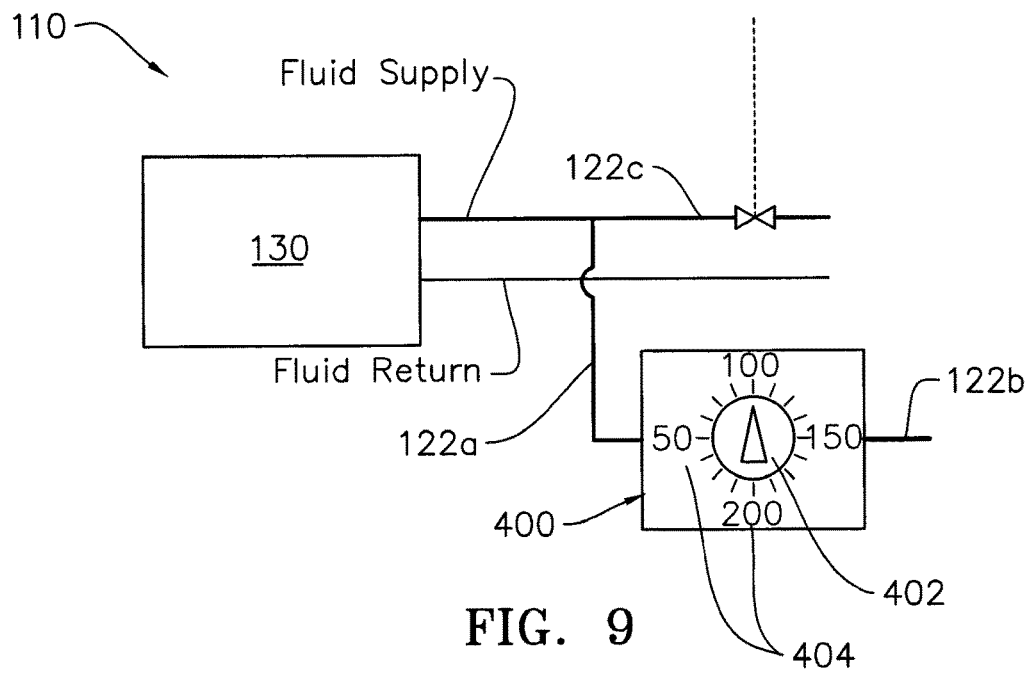
FIG. 9 is a schematic illustration of a portion of another embodiment of the closed-loop feedback circuit of FIG. 5 but with the pilot pressure control valve replaced with a manually operated pressure regulating valve.

Furthermore, it should be understood that the pilot pressure control valve 114 and the control module 112 may be combined into a single manually operated pressure regulating valve. In such an embodiment, the manually operated pressure regulating valve would preferably include labels or markers relating each pressure setting to the gauge wheel reaction force. In the same embodiment, the output pilot pressures corresponding to the desired gauge wheel downforce Fd would also be set manually. Such an embodiment is shown in FIG. 9, which illustrates a portion of the closed-loop feedback circuit 110 wherein control module 112 and the pilot pressure valve 114 are replaced by a manually operated pressure regulating valve 400. The valve 400 includes a controller 402 such as a dial or knob, and settings 404 corresponding to the desired gauge wheel downforce Fd, which may be indicated in pounds force as illustrated or in any other desired units.

Figure 10:
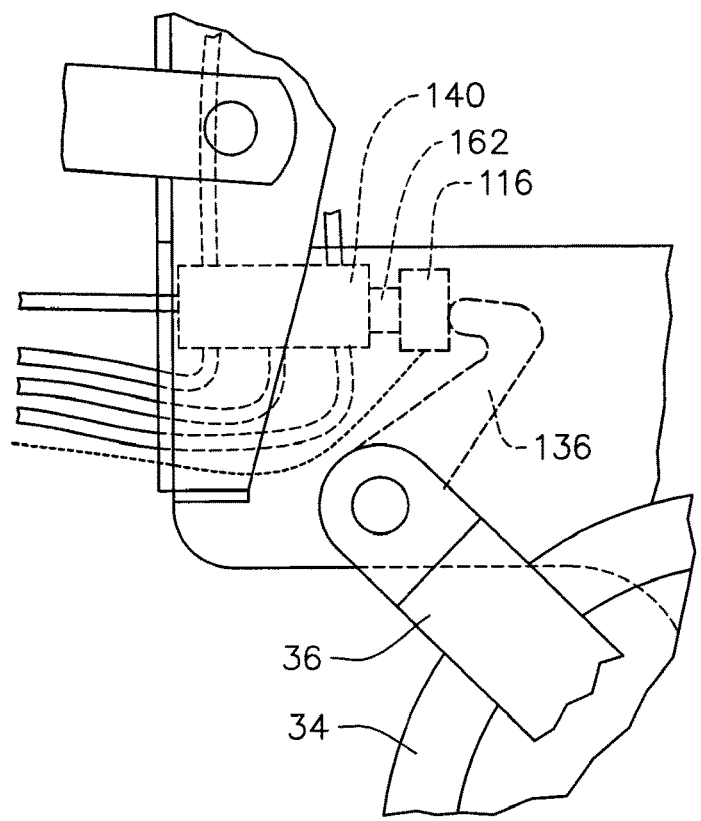
FIG. 10 is a partial side elevation view of another embodiment of the dynamic supplemental downforce control system of FIG. 4 illustrating a piezoelectric load cell.

In another embodiment, the load sensor 116 may include a piezoelectric load cell such as a compression load cell model no. FSH00402 available from Futek in Irvine, Calif., which may be disposed between the direction control valve 140 and the lever 136. Such an embodiment is illustrated in FIG. 10, in which a load cell 116 is mounted to the distal end of the spool shaft 162 of the direction control valve 140.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. A dynamic supplemental downforce control system for a planting implement having a plurality of row units, comprising:
   a downforce actuator associated with a gang of row units comprising multiple ones of the plurality of row units, each of said row units generating an actual gauge wheel downforce Fa during planting operations, said downforce actuator disposed to operably change said actual gauge wheel downforce Fa of said gang of row units when actuated;
   a control module for defining a desired gauge wheel downforce Fd; and
   a valve in fluid communication with said downforce actuator and associated with said gang of row units.

2. The dynamic supplemental downforce control system of claim 1, wherein said valve is mounted to one of said gang of row units associated with said downforce actuator.

3. The dynamic supplemental downforce control system of claim 2 further including a solenoid associated with and mounted to one of said gang of row units, wherein a command signal sent by said control module causes said solenoid to modify an operating state of said valve.

4. The dynamic supplemental downforce control system of claim 1 further comprising:
   at least one load sensor associated with at least one of said gang of row units, said at least one load sensor disposed to measure said actual gauge wheel downforce Fa of said associated at least one of said gang of row units, said at least one load sensor in electrical communication with said control module.

5. The dynamic supplemental downforce control system of claim 4, wherein said valve adjusts a pressure in said downforce actuator in order to bring said actual gauge wheel downforce Fa of said gang of row units closer to said desired gauge wheel downforce Fd.

6. The dynamic supplemental downforce control system of claim 1, wherein said valve adjusts a pressure in said downforce actuator in order to bring said actual gauge wheel downforce Fa of said gang of row units closer to said desired gauge wheel downforce Fd.

7. The dynamic supplemental downforce control system of claim 1 further comprising:
   a transport position detector to detect when said gang of row units are in a transport position, whereby when said transport position detector detects that said gang of row units are in a transport position, said downforce actuator is prevented from actuating.

8. The dynamic supplemental downforce control system of claim 1, wherein said valve is a direction control valve.

9. A dynamic supplemental downforce control system for a planting implement having a plurality of row units generating an actual gauge wheel downforce Fa during planting operations, the dynamic supplemental downforce control system comprising:
   a downforce actuator disposed to operably change the actual gauge wheel downforce Fa when actuated on a gang of row units comprising multiple ones of said plurality of row units; and
   a valve operably connected to said downforce actuator, said valve mounted to one of said row units comprising said gang of row units, said valve configured to modify a pressure in said downforce actuator in order to modify said actual gauge wheel downforce Fa to a desired gauge wheel downforce Fd.

10. The dynamic supplemental downforce control system of claim 9, further comprising:
    a solenoid mounted to said one row unit, said solenoid operably connected to said valve for modifying an operating state of said valve.

11. The dynamic supplemental downforce control system of claim 9, further comprising:
    a fluid supply line extending to said one row unit and coupled to an inlet port of said valve, whereby fluid is communicated from a fluid source to said valve via said fluid supply line; and
    a fluid return line extending to said one row unit and coupled to a return port of said valve, whereby fluid is returned from said valve to said fluid source via said fluid return line.

12. The dynamic supplemental downforce control system of claim 9, further comprising:
    a control module for inputting said desired gauge wheel downforce Fd, said control module in operable communication with said valve for communicating said desired gauge wheel downforce Fd to said valve, wherein said valve modifies said pressure in said downforce actuator in order to bring said actual gauge wheel downforce Fa closer to said desired gauge wheel downforce Fd.

13. The dynamic supplemental downforce control system of claim 12, further comprising:
   at least one load sensor mounted to at least one said row units comprising said gang of row units and disposed to measure said actual gauge wheel downforce Fa applied to said at least one row unit, wherein said at least one load sensor is in electrical communication with said control module, wherein said at least one load sensor communicates said actual gauge wheel downforce Fa to said control module.

14. A dynamic supplemental downforce control system for a plurality of row units, each of the plurality of row units generating an actual gauge wheel downforce Fa during planting operations, the dynamic supplemental downforce control system comprising:
   a downforce actuator disposed to operably change the actual gauge wheel downforce Fa of said plurality of row units when said downforce actuator is actuated; and
   a closed-loop feedback circuit comprising a valve to which a desired gauge wheel downforce Fd and said actual gauge wheel downforce Fa are communicated for controlling fluid flow to said downforce actuator to bring said actual gauge wheel downforce Fa closer to said desired gauge wheel downforce Fd, wherein said valve is mounted to one of the plurality of row units to which said downforce actuator is associated.

15. The dynamic supplemental downforce control system of claim 14 wherein said closed-loop feedback circuit comprises an electro-hydraulic closed-loop feedback circuit.

16. The dynamic supplemental downforce control system of claim 14 wherein said closed-loop feedback circuit includes a control module for inputting said desired gauge wheel downforce Fd.

17. The dynamic supplemental downforce control system of claim 16 wherein said control module is integrated with a monitor, said monitor in electrical communication with a seed sensor associated with each of said plurality of row units, said monitor configured to display a seed metering criterion based on signals received from said seed sensor.

18. The dynamic supplemental downforce control system of claim 16 wherein said control module cooperates with a GPS and is configured to store a map of the actual gauge wheel downforce Fa during planting operations.

19. The dynamic supplemental downforce control system of claim 14 further comprising:
   a control module, and a solenoid in electrical communication with said control module wherein said desired gauge wheel downforce Fd is transmitted to said valve via said solenoid.

* * * * *